INVENTOR.
FRANK GAZDIK
BY
ATTORNEY

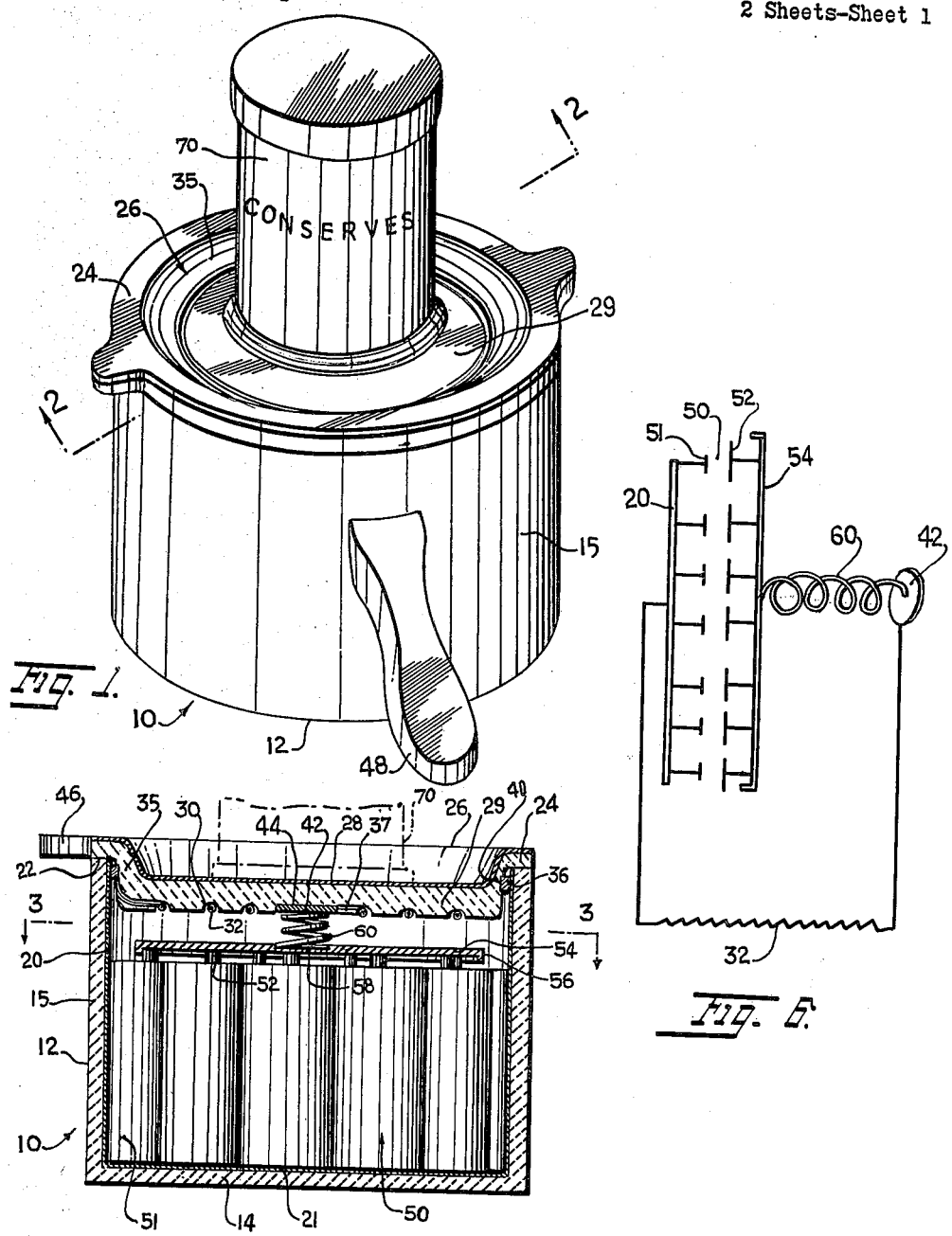

United States Patent Office 3,105,138
Patented Sept. 24, 1963

3,105,138
BATTERY POWERED HEATER FOR CONSERVES
Frank Gazdik, Kingsbery Road, Zephyr Cove, Nev.
Filed Dec. 7, 1961, Ser. No. 157,660
6 Claims. (Cl. 219—43)

This invention concerns a battery powered heater for conserves and the like.

According to the invention there is provided a convenient, portable electric heater especially useful at camps, picnics and other places and occasions when it is required to heat food conserved in jars and cans for immediate consumption. The heater includes its own electric battery power supply. A plate or tray is an integral part of the heater and includes heating coils. Food may be heated in a can or jar placed on the tray or the food can be emptied into the tray and heated in the device. Thereafter the tray can be removed from the heater and used as a serving tray or plate for the heated food.

It is therefore a principal object of the invention to provide a battery powered food heater.

Another object is to provide a food heater including an array of batteries supported in a stand on which is a removable dished tray having heating coils in circuit with the batteries.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a perspective view of the heater with a can or jar of conserves removably disposed thereon in position for heating.

FIG. 2 is a vertical central sectional view taken on line 2—2 of FIG. 1.

FIG. 6 is a diagram of the electrical circuit of the heater.

Figure 3:
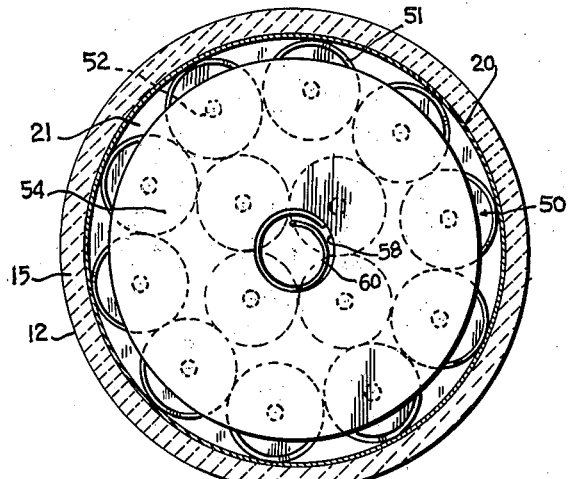
FIG. 3 is a horizontal sectional view taken on line 3—3 of FIG. 2.
Figure 5:
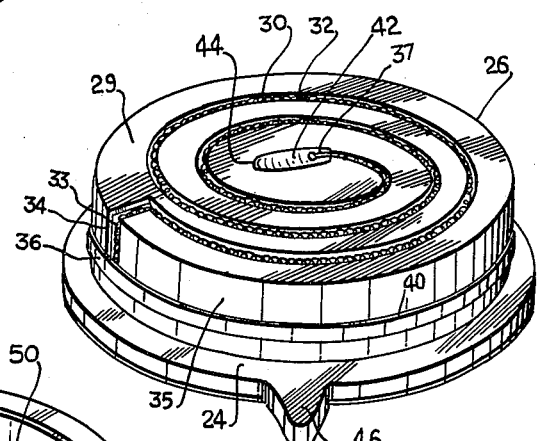
FIG. 5 is a perspective view of the tray in an inverted position.
Figure 4:
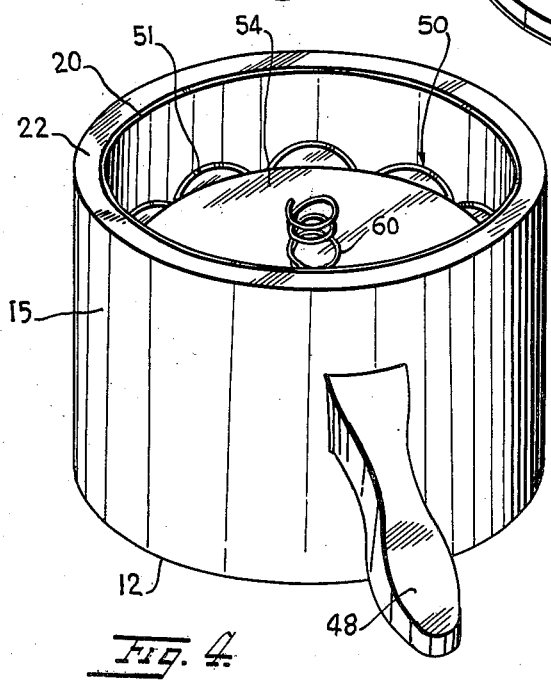
FIG. 4 is a perspective view of the heater with tray removed.

Referring to FIGS. 1-4, there is shown heater 10 including a base or stand 12. This base is a cylindrical member with a flat bottom 14 and upstanding cylindrical wall 15. The base is preferably formed of china, porcelain or other vitreous or plastic thermally insulated material. The interior of the base is lined with an electrically conductive metal film 20. This lining is preferably brass or copper and may be applied by electroplating. The base has a flat top annular edge 22 on which removably rests an annular flange 24 extending radially outward of a dished tray 26. This tray is also preferably formed of vitreous material, plastic or other thermally insulated material. The tray may have a glazed top surface 28. In the flat bottom 29 of the tray, as best shown in FIGS. 2 and 5, is a spiral groove 30. In this groove are seated coils of electrical resistance heating wire 32. One end of the wire terminates in a lead 33 extending through a groove 34 in the outer side 35 of the tray and connected to an electrically conductive metal ring 36. The ring is seated in a circumferential groove 40. The outer side of the ring projects slightly outward of the outer cylindrical side 35 of the tray. This ring makes electrical contact with the conductive lining 20 of the base 12, when the tray is seated on the base as shown in FIGS. 1 and 2.

The inner end of the wire 32 terminates in a lead 37 connected to a metal disk 42 seated in a recess 44 formed centrally in the bottom of the tray. The wire 32 and disk 42 are recessed so that the bottom of the tray is flat and can be set down on a flat surface. Outwardly extending tabs or finger grips 46 are formed on the flange 24 of the tray to facilitate handling the tray. A handle 48 extends radially outward of the wall 15 of the base to facilitate carrying the assembled heater.

A plurality of cylindrical or rectangular batteries 50 may be disposed inside the base with their metal, electrically negative casings 51 in electrical and mechanical contact with the bottom 21 of lining 20. On the upwardly projecting positive, central terminals 52 of the batteries is a removable metal plate 54. This plate has a depending circumferential rim or skirt 56 engaged at the outer sides of the positive terminals of the batteries to hold the plate stationary and prevent it from moving laterally to contact lining 20.

A central recess 58 is formed in the upper side of plate 54. In this recess is seated a coil spring 60. The spring contacts the disk 42 in tension when the tray is seated on the base. Then the electric circuit of the heater is closed and the coils of wire 32 are energized.

FIG. 6 shows the electrical circuit of the heater. The positive terminals 52 of the batteries 50 are connected in parallel via plate 54, spring 60 and disk 42 to one end of resistance heater wire 32. The other end of the heater wire 32 is connected via the conductive lining 20 to the negative terminals 51 of the batteries in parallel.

The heater coils are energized and the tray is heated when the tray is mounted on the base. A can or jar of conserves 70 if mounted on the tray will become hot. When the tray is removed, the can or jar 70 removably disposed thereon will be kept hot while the thermally insulated tray remains hot. The food may be poured into the tray to be heated while the tray is on the base. Removing the tray from the base deenergizes the heater wire. For convenience in transportation and storage, the tray can be inverted on the base, which will prevent the heater wire from becoming energized. By turning the tray over to engage ring 36 with lining 20 and disk 42 with spring 60, the circuit will be closed. While the heater is in operation the cool handle 48 can be grasped for carrying the entire assembled heater. The base alone with batteries therein can be carried by grasping handle 48.

The heater described provides a safe, convenient means for heating food and for keeping it hot, either in a jar or can or out of the jar or can. The tray serves as both a heating means in the heater and as a hot serving plate away from the heater.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A portable heater, comprising a cylindrical base of electrically insulating material, a conductive lining in the base adapted to be contacted by the negative terminals of electric batteries, a tray of electrically insulating material removably seated on the base, electric wire heater coils seated in grooves in the bottom of said tray, an electrical conductor carried by the tray in circuit with one end of said coils and adapted to be contacted by said conductive lining, an electrically conductive disk connected to another end of said coils, said disk being seated in a recess in the bottom of the tray for connection with positive terminals of the batteries.

2. A portable heater, comprising a cylindrical base of electrically insulating material, a conductive lining in the base, a plurality of batteries standing in said base with electrically negative cases of the batteries in contact with said lining, a tray of electrically insulating material removably seated on the base, electric wire heater coils seated in grooves in the bottom of the tray, an electrically conductive ring carried by the tray and connected in circuit with one end of said coils, said ring contacting said lining, an electrically conductive disk connected to another end of said coils, said disk being seated in a recess in the bottom of the tray, an electrically conductive plate seated and peripherally engaged on positive terminals of the batteries, and a spring disposed between said conductive plate and disk completing an electrical circuit therebetween whereby the heater coils are energized.

3. As an article of manufacture, a heater accessory comprising a tray of electrically insulating material having a dished bottom and open top, an annular flange extending radially outward of said open top, said bottom having a spiral groove formed therein, an electrical resistance heater coil engaged in said groove, an electrically conductive ring seated in a circumferential groove in an outer side wall of the bottom of the tray, said ring being connected to one end of said coil, and an electrically conductive disk seated in a recess centrally disposed at the bottom of the tray, said disk being electrically connected to the other end of said coil.

4. As an article of manufacture, a heater accessory comprising a tray of electrically insulating material having a dished bottom and open top, an annular flange extending radially outward of said open top, said bottom having a spiral groove formed therein, an electrical resistance heater coil engaged in said groove, an electrically conductive ring seated in a circumferential groove in an outer side wall of the bottom of the tray, said ring being connected to one end of said coil, and an electrically conductive disk seated in a recess centrally disposed at the bottom of the tray, said disk being electrically connected to the other end of said coil, said flange having radial extensions forming finger grips.

5. As an article of manufacture, a heater accessory comprising a tray having a dished bottom and open top, an annular flange extending radially outward of said open top, said bottom having a spiral groove formed therein, an electrical resistance heater coil engaged in said groove, an electrically conductive ring seated in a circumferential groove in an outer side wall of the bottom of the tray, said ring being connected to one end of said coil, and an electrically conductive disk seated in a recess centrally disposed at the bottom of the tray, said disk being electrically connected to the other end of said coil, said flange having radial extensions forming finger grips, said tray being formed of thermally insulated vitreous material, with a glaze on the upper dished surface of the tray.

6. A portable heater, comprising a cylindrical base, a conductive lining in the base adapted to be contacted by terminals of electric batteries, a tray of electrically insulating material removably seated on the base, electric wire heater coils seated in grooves in the bottom of said tray, an electrical conductor carried by the tray in circuit with one end of said coils and adapted to be contacted by said conductive lining, an electrically conductive disk connected to another end of said coils, said disk being seated in a recess in the bottom of the tray for connection with positive terminals of the batteries, said base being formed of thermally insulated material, and a handle extending radially outward of said wall of the base for carrying the assembled heater.

References Cited in the file of this patent

UNITED STATES PATENTS

| 1,062,344 | Mann | May 20, 1913 |
| 2,609,478 | Crawford et al. | Sept. 2, 1952 |
| 2,817,744 | Free | Dec. 24, 1957 |

FOREIGN PATENTS

| 984,963 | France | Mar. 7, 1951 |
| 155,347 | Sweden | July 24, 1956 |